United States Patent Office 3,741,926
Patented June 26, 1973

3,741,926
CEMENT COMPRISED OF ZINC OXIDE AND
ACRYLIC ACID COPOLYMER
Anton Jurecic, Springfield, Del., assignor to Pennwalt
Corporation, Philadelphia, Pa.
No Drawing. Continuation-in-part of abandoned application Ser. No. 18,319, Mar. 10, 1970. This application
July 1, 1971, Ser. No. 159,018
Int. Cl. C08f 45/24, 45/04
U.S. Cl. 260—29.6 M  5 Claims

ABSTRACT OF THE DISCLOSURE

A copolymer comprised of 10 to 90 mole percent of acrylic acid and at least one mono-olefinically unsaturated polycarboxylic acid selected from the group consisting of glutaconic acid, aconitic acid, citraconic acid, mesaconic acid, itaconic acid, fumaric acid, maleic acid and tiglic acid, is mixed with zinc oxide to prepare improved cements for dental and orthopedic use.

---

This application is a continuation-in-part of Ser. No. 18,319, filed Mar. 10, 1970, now abandoned.

This invention concerns acrylic acid copolymers and their use in zinc oxide-based cement compositions for dental and orthopedic use.

The copolymer of this invention comprises from 10 to 90 mole percent of acrylic acid copolymerized with at least one mono-olefinically unsaturated polycarboxylic acid selected from the group consisting of glutaconic acid, aconitic acid, citraconic acid, mesaconic acid, itaconic acid, fumaric acid, maleic acid and tiglic acid. Thus, the copolymers of this invention include not only two component copolymers but terpolymers, quadripolymers, etc. The preferred acrylic acid proportion in the copolymers is from about 55 to 65 mole percent. In addition to polymerized units of acrylic acid and at least one of said ethylenically unsaturated polycarboxylic acids, the copolymer embodied herein may contain as optional components minor amounts, i.e., up to about 5 mole percent, of copolymerized alkyl ester of acrylic acid, e.g., esters wherein the alkyl group has from one to about eight carbon atoms, such as methyl acrcylate, ethyl acrcylate, butyl acrcylate and 2-ethylhexyl acrylate.

Another embodiment of this invention is a dental cement composition comprising a mixture of from about 25 to about 75 parts per weight of the described acrylic acid copolymer with 100 parts per weight of zinc oxide.

The preparation of the acrylic acid copolymers embodied herein is carried out using conventional free-radical catalyzed polymerization techniques in aqueous reaction medium. Suitable free-radical-forming catalysts are ammonium persulfate, potassium persulfate, hydrogen peroxide, and the liike. It is preferred to use the well known redox initiator system to facilitate polymerization, for example, such additives in small quantities as alkali metal sulfites and thiosulfites, ferrous sulfate, dihydroxyacetone and ascorbic acid.

The quantity of reaction medium for the polymerization is generally from about 300 to 400 parts of water per 100 parts of the acid monomers. The polymerization is advantageously carried out in the substantial absence of oxygen and, for best results, the polymerization temperature is within the range of 60° C. to 85° C. About 5 to 8 hours of reaction is generally required to ensure essentially complete conversion of the monomers to copolymer.

The copolymer products are miscible with and soluble in the aqueous reaction medium. For subsequent use as a cement ingredient, a portion of the water may be stripped off using sub-atmospheric, low temperature distillation to provide a concentrated aqueous solution containing from about 40 to about 55 weight percent polymer solids, preferably 47 to 52% polymer.

The acrylic acid copolymers of this invention have a molecular weight within the range of about 20,000 to 75,000, preferably about 30,000 to 40,000, as measured by capillary viscosity in dioxane solvent at 30° C.

The cement compositions of this invention are prepared by uniformly mixing a measured amount of the acrylic acid copolymer, preferably in liquid form as a 40 to 55% aqueous solution, with conventional zinc oxide powder (approximately 1 to 50 microns particle size range). The preferred proportions in parts by weight of the cement ingredients are about 4 to 8 parts acrylic acid copolymer, about 10 to 18 parts zinc oxide and about 4 to 9 parts water. Other compatible liquid media in which the copolymer is soluble can be substituted for part or all of the water to control viscosity characteristics of the cement, such as, for example, monohydric and polyhydric alcohols, e.g., ethanol, glycerol, glycols and sorbitol. The zinc oxide constituent can, as is well known in the art, include minor amounts of modifying ingredients such as MgO, $SiO_2$, $Bi_2O_3$, BaO, $BaSO_4$, CaO, $Al_2O_3$, NaF, $CaWO_4$ and the like, as well as chelating agents such as eugenol and ethoxybenzoic acid. Other modifying agents that can be added to the cement mixture are monovalent metal salts, e.g., halides, sulfates and phosphates, such as NaCl, $Na_2SO_4$ and NaI, for the purpose of improving handling properties and accelerating or delaying setting time. In general, salt solutions decrease viscosity and extend working time. For example, NaCl added in about 0.004 wt. percent concentration based on the polymer makes handling easier and delays setting time for 5 minutes at room temperature. When an equal amount of $NaH_2PO_4$ is added, the setting time is extended to more than 15 minutes.

After the cement ingredients are thoroughly mixed, the mixture may be easily worked for at least from 2 to 5 minutes, after which the cement begins to set in a hard mass, depending on the powder/liquid ratio, added salts, temperature, and spatulation technique. The resulting cement is employed in dental techniques as a binder, cementing and luting medium, in hard-set impression pastes, as an adhesive in orthodontic work, in periodontal packs, and as restorative filling material. The cement compositions embodied herein also are useful as surgical and orthopedic cements, for example, in such techniques as fusion of metal implants to bone utilizing the cement.

The dental cement compositions of this invention have superior strength and adhesive properties compared to the acrylic polymer-zinc oxide cements known heretofore. Other advantages of the new compositions are easier spatulation and workability.

In the following examples amounts of ingredients and reactants are given in parts by weight unless otherwise indicated. The proportions of constituents of copolymers are given in mole percents.

EXAMPLE 1

To a suitably equipped reaction vessel are charged 450 parts distilled water, 4.5 parts ammonium persulfate and 80 parts itaconic acid. The air in the vessel is evacuated and replaced with a blanket of nitrogen gas. The contents of the vessel are heated to 60° C. with stirring, whereupon 80 parts of acrylic acid is added incrementally. The polymerization temperature rises to 80° C. where it is maintained during the four hours of acrylic acid addition and for one additional hour thereafter. The product, a 65% acrylic acid-35% itaconic acid copolymer, is recovered as an aqueous solution containing 26% polymer. This copolymer solution is a colorless liquid, having a relative viscosity of 380 cst., determined in a Ubelohde viscometer. The polymer solution is evaporated under a vacuum (20–30 mm. Hg absolute pressure) at 40° C. for 5 hours to yield a concentrated solution containing 48% polymer solids.

The foregoing procedure is repeated using various proportions of acrylic acid and itaconic acid to produce the following copolymers:

88% acrylic acid—12% itaconic acid
55% acrylic acid—45% itaconic acid
37.5% acrylic acid—62.5% itaconic acid A dental cement composition is produced by blending 10 parts of a 48.7% aqueous solution of the representative 37.5% acrylic acid-62.5% itaconic acid copolymer with 15 parts of a powdery 90:10 mixture of ZnO and MgO containing small amounts of $Al_2O_3$, $BaSO_4$ and $CaWO_4$. The compressive strengths of the cement, measured at various time intervals are:

24 hours, average _____ p.s.i__ 13,100
7 days, average _____ p.s.i.g__ 14,400
30 days, average _____ p.s.i__ 13,900

The other copolymers prepared above give comparable results as the polymer component in zinc oxide cements.

EXAMPLE 2

A terpolymer of 54% acrylic acid; 8% maleic acid and 38% itaconic acid is prepared using the procedure of the previous example. The physical form of the copolymer is an aqueous solution containing about 50% polymer. The terpolymer is used to prepare a high quality zinc oxide cement.

EXAMPLE 3

To a polymerization reactor are charged 150 parts water, 10 parts citraconic acid, 0.1 part ascorbic acid and 0.0005 part ferrous sulfate. The vessel is evacuated to remove oxygen and, under a protective atmosphere of nitrogen, 40 parts of acrylic acid, in which is dissolved 0.2 part hydrogen peroxide, is added incrementally at 70° C. over a period of 4 hours; the reaction is continued for an additional hour. The product, an 88% acrylic acid-12% citraconic acid copolymer, is recovered, after some water removal under vacuum, as a solution in water containing 40% polymer solids. One part of this solution is mixed with 1.5 parts of zinc oxide powder and applied over a small area of polished enamel. The bond, cured at room temperature for five hours, requires 900 p.s.i. force to rupture it as determined on an Instron Universal testing machine.

EXAMPLE 4

Using the foregoing redox polymerization system and 1.5 parts $K_2S_2O_8$ and 1.0 part $Na_2S_2O_3$ per 100 parts of monomers as initiators, a 90% acrylic acid-10% itaconic acid copolymer is prepared and found to give excellent results as a component in zinc oxide cement.

EXAMPLE 5

Using the polymerization recipes of either Example 1 or Example 3, the following copolymers are prepared and tested, with excellent results, in zinc oxide dental cements.

88% acrylic acid-12% glutaconic acid
88% acrylic acid-12% mesaconic acid
90% acrylic acid-10% aconitic acid
88% acrylic acid-12% citraconic acid
88% acrylic acid-12% tiglic acid
52% acrylic acid-31% itaconic acid-17% maleic acid
64% acrylic acid-34.5% itaconic acid-1,5% butyl acrylate
64% acrylic acid-35% itaconic acid-1% 2-ethylhexyl acrylate
50% acrylic acid-30% citraconic acid-15% aconitic acid-5% maleic acid
50% acrylic acid-40% glutaconic acid-8.5% itaconic aicd-1.5% ethyl acrylate
50% acrylic acid-30% citraconic acid-15% itaconic acid-5% methyl acrylate.

I claim:
1. A cement composition comprising a mixture of zinc oxide and a copolymer having a molecular weight within the range of about 20,000 to 75,000, said copolymer consisting essentially of copolymerized units of from about 55 to 65 mole percent of acrylic acid, 0 to about 5 mole percent of copolymerized units of alkyl ester of acrylic acid wherein the alkyl group of the ester has from 1 to about 8 carbon atoms, and the remainder copolymerized units of at least one unsaturated polycarboxylic acid selected from the group consisting of glutaconic acid, aconitic acid, citraconic acid, mesaconic acid, itaconic acid, fumaric acid, maleic acid and tiglic acid, the weight ratio of zinc oxide to said acrylic acid copolymer therein being from about 1.25:1 to about 4.5:1, said composition characterized by setting to a hard mass after mixing in the presence of compatible liquid media.

2. A cement composition according to claim 1 wherein the polycarboxylic acid comonomer is itaconic acid.

3. A cement composition according to claim 1 wherein the polycarboxylic acid comonomers are itaconic acid and maleic acid.

4. A cement composition according to claim 1 comprise of about 10 to 18 parts by weight zinc oxide, about 4 to 8 parts by weight of copolymer and about 4 to 9 parts compatible liquid media in which the copolymer is soluble.

5. A cement composition according to claim 4 wherein the liquid media is water, monohydric alcohol, polyhydric alcohol, or mixtures thereof.

References Cited

UNITED STATES PATENTS

| | | | |
|---|---|---|---|
| 3,426,004 | 2/1969 | Wagner | 260—80.3 |
| 3,493,500 | 2/1970 | Volk | 260—78.5 R |
| 3,563,736 | 2/1971 | Koehler | 260—41 B |
| 3,586,654 | 6/1971 | Lerman | 260—41 B |
| 3,055,873 | 9/1962 | Hull | 260—78.5 R |
| 3,655,605 | 4/1972 | Smith | 260—41 B |

MORRIS LIEBMAN, Primary Examiner

P. R. MICHL, Assistant Examiner

U.S. Cl. X.R.

32—15; 260—33.4 R, 41 B, 78.5 R